Feb. 4, 1964  W. G. WALTERMIRE ETAL  3,120,254
SELF TAPPING SCREW HAVING GRID-LIKE BEARING SURFACE
Filed Sept. 1, 1960

INVENTORS
WILLIAM G. WALTERMIRE
ARTHUR R. BREED
BY Hudson, Boughton,
Williams, David & Hoffman
ATTORNEYS United States Patent Office 3,120,254
Patented Feb. 4, 1964

3,120,254
SELF TAPPING SCREW HAVING GRID-LIKE
BEARING SURFACE
William G. Waltermire, Seven Hills, Cleveland, and
Arthur R. Breed, Euclid, Ohio, assignors to The Lamson
& Sessions Company, Cleveland, Ohio, a corporation of
Ohio
Filed Sept. 1, 1960, Ser. No. 53,523
1 Claim. (Cl. 151—37)

The present invention relates to fastener elements and particularly to tapping screws.

Tapping screws are those which cut or form a thread as the screw is driven into material by rotating the screw. Such screws are provided with heads which are driven to insert the screws and the undersides of which engage the material receiving the screw when the screws are driven home. One of the problems that arise with tapping screws is that the driving torque will, when the head of the screw engages the material receiving the screw, cause rotation of the screw without advancement thereof which, in turn, will cause a stripping of the threads formed by the screw and a loss of holding power. Furthermore, the driving torque will be translated into a pretensioning stress of the screw and hole material even though the threads are not actually stripped.

An object of the present invention is to provide a new and improved tapping screw which, as compared to known tapping screws, is less likely to strip the threads formed during driving and which will have a lesser tendency to prestress the screw and hole material when loaded.

A further object of the present invention is to provide a tapping screw which is so constructed that the burrs thrown up when the screw is driven into receiving material, particularly a soft material, will be trapped in such a manner as to increase the torque necessary to rotate the screw as the head thereof engages the material which receives the screw.

A still further object of the present invention is to provide a tapping screw or bolt, as in the preceding objects, which is of such a construction that the manufacture thereof requires dies which are relatively small in cost.

A still further object of the present invention is to provide a new and improved fastening element which is to resist turning movement relative to a member against which it bears and which requires a higher than normal torque to break loose and turn the element.

In accordance with the present invention, the tapping screw or fastener element is provided with a grid-like construction on the bearing side thereof which grid is comprised of a plurality of generally V-shaped projections defining closed recesses and which offer resistance to turning when the element is loaded, the grid also functioning to trap burrs thrown up by the driving of the screw, when the element is a screw, as it is driven into its receiving material, the burrs raising the torque necessary to load the screw and hole material.

Further objects and advantages of the present invention will be apparent from the following detailed description of the preferred embodiment thereof made with reference to the accompanying drawing forming a part of the present specification and in which.

Figure 3:
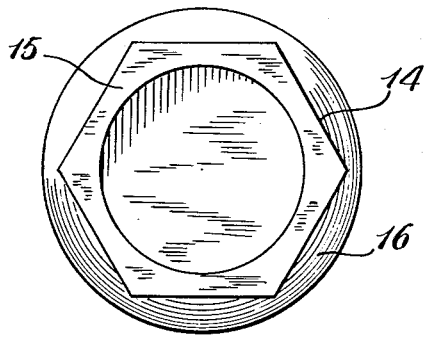
FIG. 3 is a plan view looking at the head of the bolt.
Figure 1:
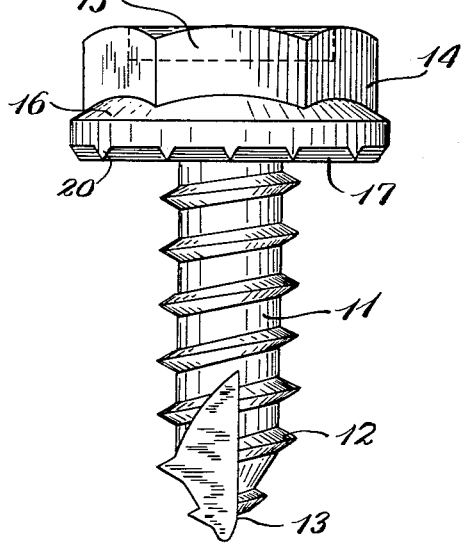
FIG. 1 is a side elevational view of a tapping screw embodying the present invention.
Figure 2:
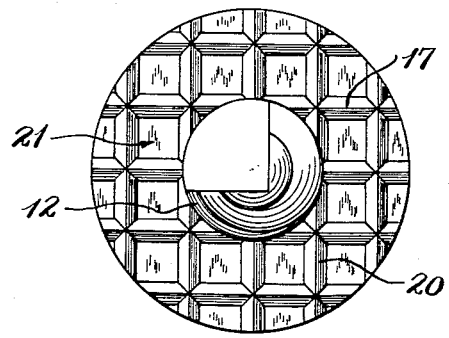
FIG. 2 is a view looking at one end of the screw, the end view from the right-hand side of FIG. 1.

Referring to the drawing, the tapping screw shown therein and embodying the present invention comprises a thread portion 11 having a raised thread 12 thereon extending about the axis of the screw from a pointed end 13 of the thread portion to the other end of the thread portion 11 which terminates adjacent a head 14. The head 14 is shown as having an outer hexagonal portion 15 and an inner circular flange portion 16 which is disposed between the head portion 15 and the adjacent end of the thread portion 11. A side 17 of the flange portion 16 adjacent the thread portion 11 extends radially to the axis of the self-tapping screw and forms the underside of the head 14. The side 17 has a plurality of V-shaped projections 20 thereon which are arranged to form a grid 21 that provides a plurality of closed recesses in the underside of the head. The projections are preferably hardened projections having a V-shaped cross section with the top of the V constituting the inner part of the projection disposed adjacent the head. In the illustrated embodiment, the projections 20 are preferably arranged in two sets of parallel rows which extend perpendicularly to each other and which define a rectangular or square grid with the space defined by each square providing a closed space or recess in the underside of the head. The projections and grid function as a torque raiser for increasing the torque necessary to load the screw.

When the screw is driven into material, the thread portion 11 will form threads as the screw is driven home and the screw will be loaded when the underside of the head 14 engages the adjacent surface of the material which receives the screw. When the head 14 engages the material which receives the screw, the projections 20 will bite into the material, increasing the torque necessary to rotate the screw and hence decreasing the proportion of driving torque which is translated into forces pretensioning the screw and hole material and tending to strip the threads formed by the screw.

While the screw is being driven into its receiving material, particularly if the material is soft, burrs will be thrown up and the grid 21 will function to trap the burrs adjacent the underside of the head 14. The trapped burrs will be chewed by the grid and will, when the screw is rotated to where the head is adjacent the material, increase the torque necessary to turn the screw and load the screw.

In addition to the foregoing, the grid 21 embeds itself into the material receiving the screw when the latter is driven home and loaded and functions to increase the torque necessary to break loose the head of a screw which has been driven home and loaded. For this latter function, the grid may also prove useful on the underside of the head of a conventional bolt. It will also be readily apparent that the grid-like structure would be useful on other fastener elements, such as nuts and washers, where the element bears against an adjacent member and is loaded to prevent turning of the element. The grid-like structure, if provided, will bite into the adjacent member on loading and the trapped material will raise the break-loose torque of the element.

While a preferred embodiment of the present invention has been described in considerable detail, it will be understood that further modifications, constructions, and arrangements are within the ability of those skilled in the art, and it is hereby my intention to cover all such constructions, modifications, and arrangements.

What we claim is:

A self-tapping screw having a head and torque raising means comprising a plurality of elongated projections on the underside of said head arranged in a plane perpendicular to the axis of said screw, said projections projecting from said side to engage the member into which said screw is threaded, said projections having a V-shaped cross section and converging outwardly from the head to provide a line edge adapted to bite into a member when rotated in engagement therewith, said projections being arranged in first and second sets of parallel rows with the rows of each set being perpendicular with respect to each other and with the projections of each row being aligned lengthwise with each other in the row whereby the projections in the row define an edge extending the length of the row, said rows defining a plurality of closed recesses with the recesses being offset from and excluding the axis of the screw and being arranged in side-by-side relationship around the axis of the screw and said head provided with tool engaging means.

References Cited in the file of this patent

UNITED STATES PATENTS

| | | |
|---|---|---|
| 910,712 | McCoy | Jan. 26, 1909 |
| 1,946,800 | MacLean | Feb. 13, 1934 |
| 2,191,613 | Ericsson | Feb. 27, 1940 |
| 2,210,455 | Hosking | Aug. 6, 1940 |
| 2,833,326 | Knohl | May 6, 1958 |
| 2,934,684 | Fegan | Apr. 26, 1960 |

FOREIGN PATENTS

| | | |
|---|---|---|
| 101,329 | Switzerland | Sept. 17, 1923 |